United States Patent
Bidner

(10) Patent No.: US 11,313,453 B2
(45) Date of Patent: Apr. 26, 2022

(54) METHODS AND SYSTEMS FOR A DRIVE AXLE

(71) Applicant: Ford Global Technologies, LLC, Dearborn, MI (US)

(72) Inventor: David Karl Bidner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 386 days.

(21) Appl. No.: 16/600,814

(22) Filed: Oct. 14, 2019

(65) Prior Publication Data

US 2021/0108715 A1   Apr. 15, 2021

(51) Int. Cl.
    *F16H 57/04* (2010.01)
    *F16H 48/40* (2012.01)

(52) U.S. Cl.
    CPC ....... *F16H 57/0436* (2013.01); *F16H 57/045* (2013.01); *F16H 57/048* (2013.01); *F16H 57/0427* (2013.01); *F16H 57/0435* (2013.01); *F16H 57/0447* (2013.01); *F16H 48/40* (2013.01)

(58) Field of Classification Search
    CPC ............. F16H 57/0436; F16H 57/0427; F16H 57/0435; F16H 57/0447; F16H 57/045; F16H 57/048; F16H 48/40
    See application file for complete search history.

(56) References Cited

U.S. PATENT DOCUMENTS

| | | | | |
|---|---|---|---|---|
| 3,590,954 A * | 7/1971 | Plantan | ................... | F16H 48/08 475/89 |
| 4,393,922 A * | 7/1983 | Bahrle | ............... | F16H 57/0415 123/41.33 |
| 5,042,618 A * | 8/1991 | Switalski | .......... | B23Q 11/1084 184/6.26 |
| 5,316,106 A * | 5/1994 | Baedke | ................. | B60K 17/16 184/104.3 |
| 6,499,565 B1 * | 12/2002 | Coyle | ................. | F16H 57/0412 184/6.12 |
| 7,959,538 B2 * | 6/2011 | Hatanaka | ................ | F02D 29/04 477/187 |
| 8,714,310 B2 * | 5/2014 | Bares | ...................... | F16D 65/78 184/6.22 |
| 9,243,527 B2 * | 1/2016 | Bidner | ................... | F01M 13/02 |
| 9,475,381 B2 * | 10/2016 | Bidner | ................. | B60K 15/013 |
| 10,138,772 B2 * | 11/2018 | Bidner | ................. | F02B 43/02 |
| 11,060,601 B2 * | 7/2021 | Farhat | .................... | F16K 31/002 |
| 2021/0108715 A1 * | 4/2021 | Bidner | ............... | F16H 57/0435 |

FOREIGN PATENT DOCUMENTS

| | | | | |
|---|---|---|---|---|
| DE | 102018202672 A1 * | 9/2018 | ......... | F16H 57/0436 |
| DE | 102018112663 A1 * | 11/2019 | ............ | F16D 48/02 |
| JP | H0670459 B2 | 9/1994 | | |

* cited by examiner

*Primary Examiner* — Michael A Riegelman
(74) *Attorney, Agent, or Firm* — Geoffrey Brumbaugh; McCoy Russell LLP

(57) ABSTRACT

Methods and systems are provided for rear axle having a wet bath. In one example, a system comprises a pump configured to spin in a first direction to flow lubricant to a cooler and a second direction to entrain the lubricant with gas.

20 Claims, 9 Drawing Sheets

METHODS AND SYSTEMS FOR A DRIVE AXLE

FIELD

The present description relates generally to lubricant flow in a drive axle sump.

BACKGROUND/SUMMARY

Hypoid gear arrangements may experience high friction levels while providing low noise and backlash. Wet bath arrangements may be used to address lubrication demands and frictional losses experienced by hypoid gear arrangements.

However, the inventors have identified some issues with the approaches described above. For example, wet baths are more expensive and have an increased packaging complexity compared to dry sumps. Additionally, fluid turbulence losses are high when lubricant temperatures are below a lower threshold temperature. Heating of the lubricant may be relatively slow as machinery and axles are used to heat the lubricant.

In one example, the issues described above may be addressed by a system for a pump arranged in a lubricant sump of a rear axle, wherein the lubricant pump is configured to drive in a first direction to direct oil to an oil cooler and a second direction to entrain gas into lubricant in the sump. In this way, a density of the lubricant may be reduced as the machinery, axles, and lubricant warm-up during a cold-start, which may decrease fluid turbulence losses.

As one example, the pump may be activated to operate in the first direction when cooling of the lubricant is desired and in the second direction, opposite the first direction, when reduced density of the lubricant is desired. In this way, the pump may be activated when a temperature of the lubricant is too low or too high while remaining deactivated when the temperature of the lubricant is within a desired range. By doing this, fuel efficiency may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
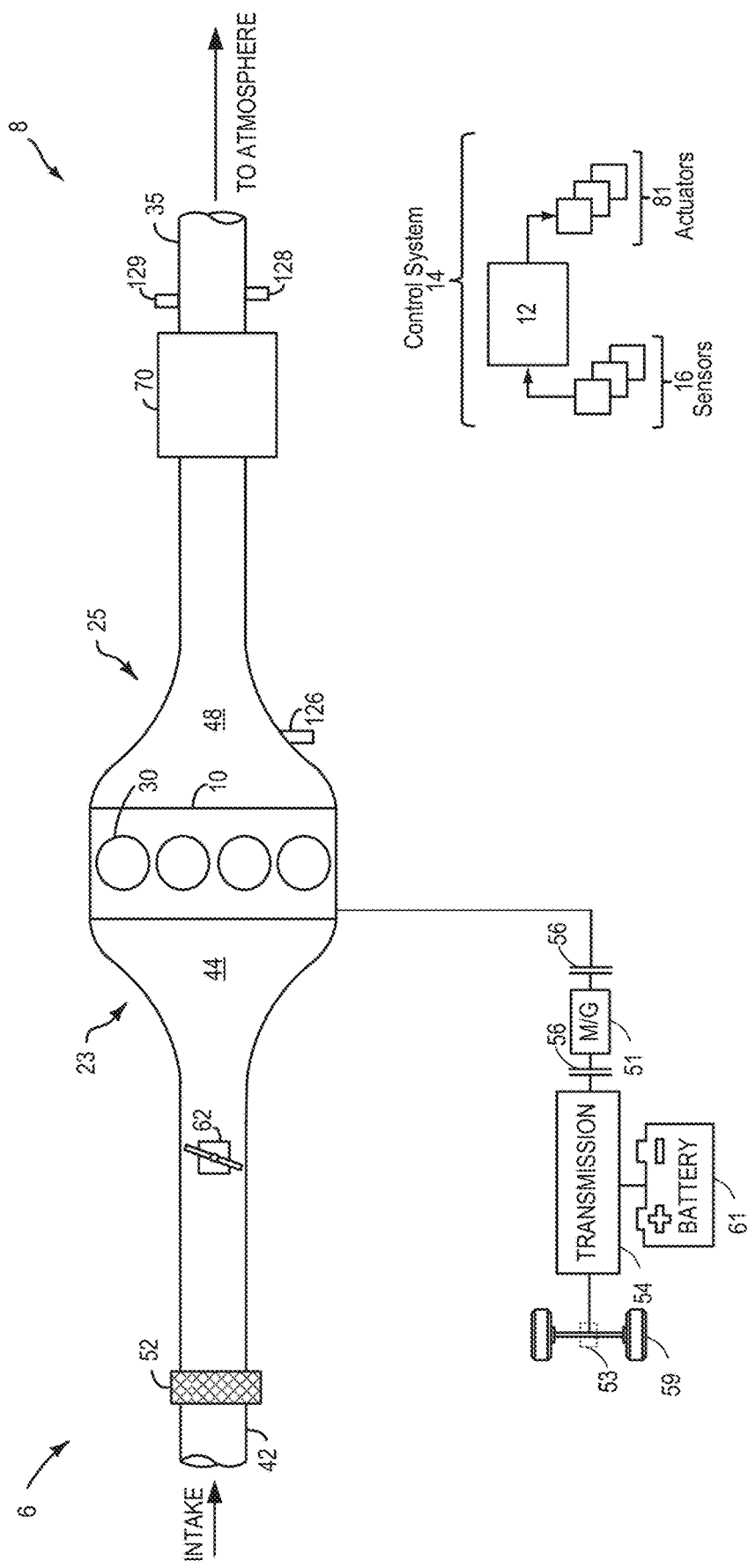
FIG. 1 illustrates a schematic of an engine included in a hybrid vehicle.
Figure 2:
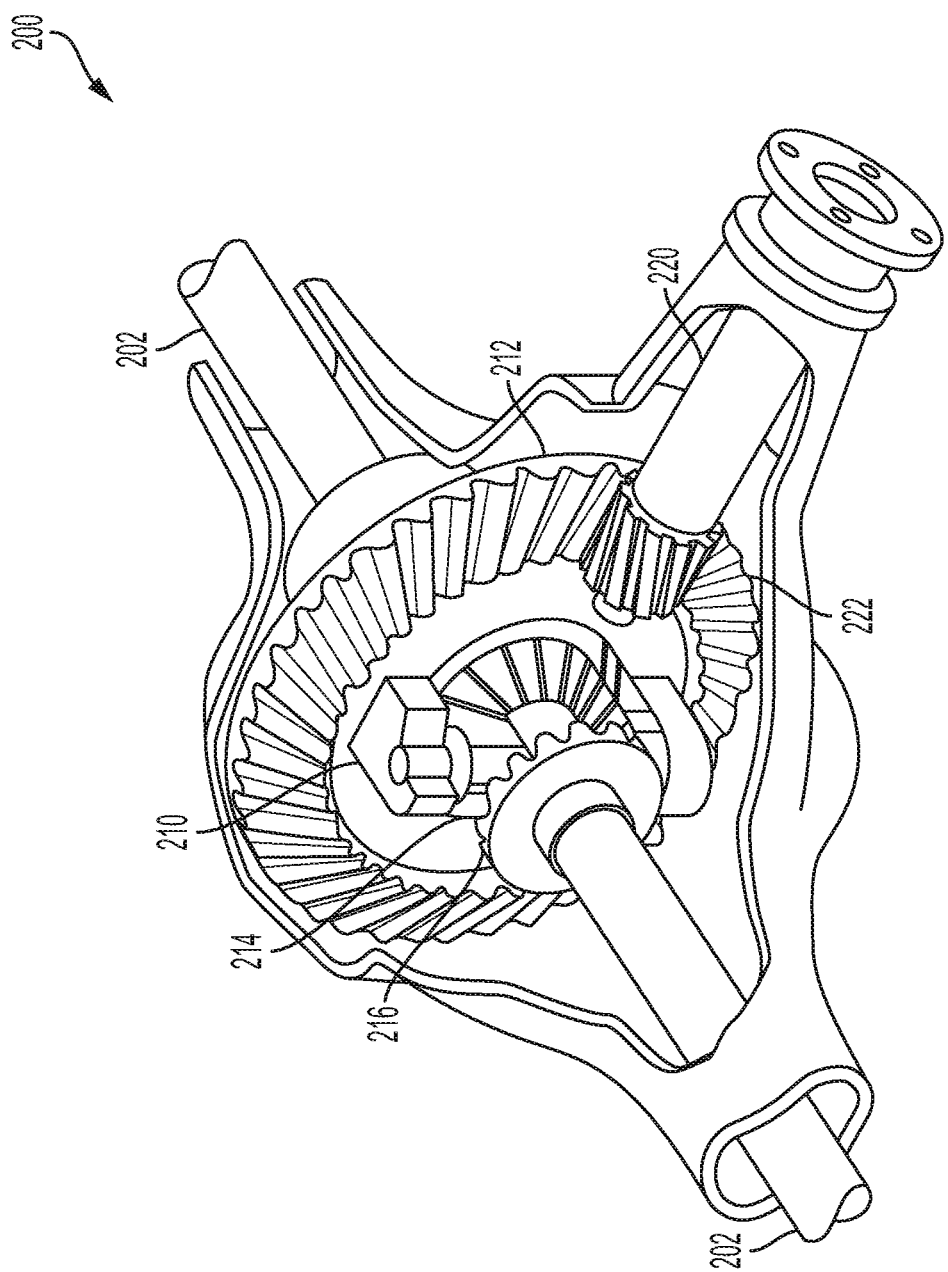
FIG. 2 illustrates a schematic of a drive axle.
Figure 3A:
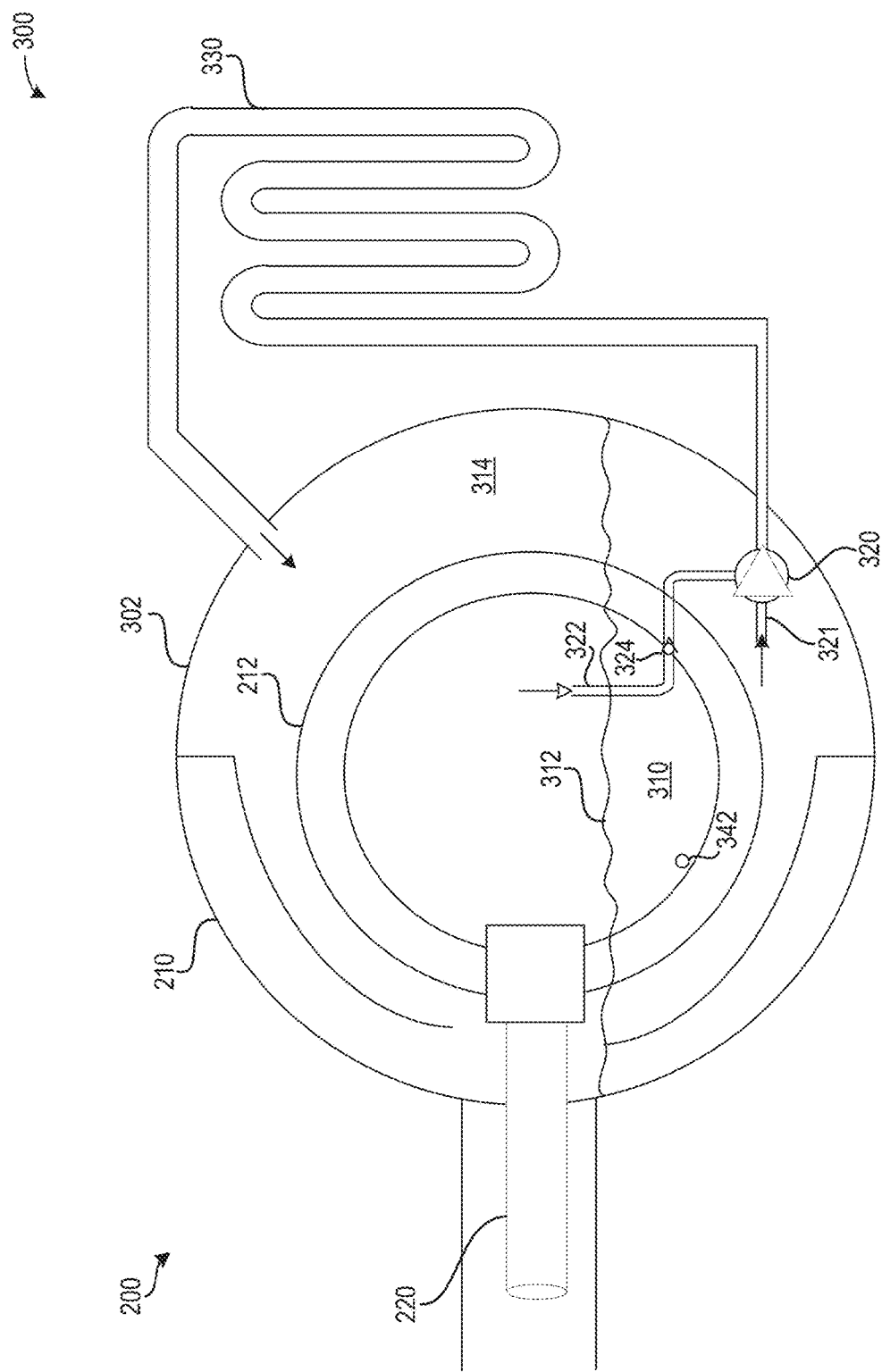
FIGS. 3A and 3B illustrate first examples of a cross-section of the drive axle comprising a one-way pump.
Figure 3B:
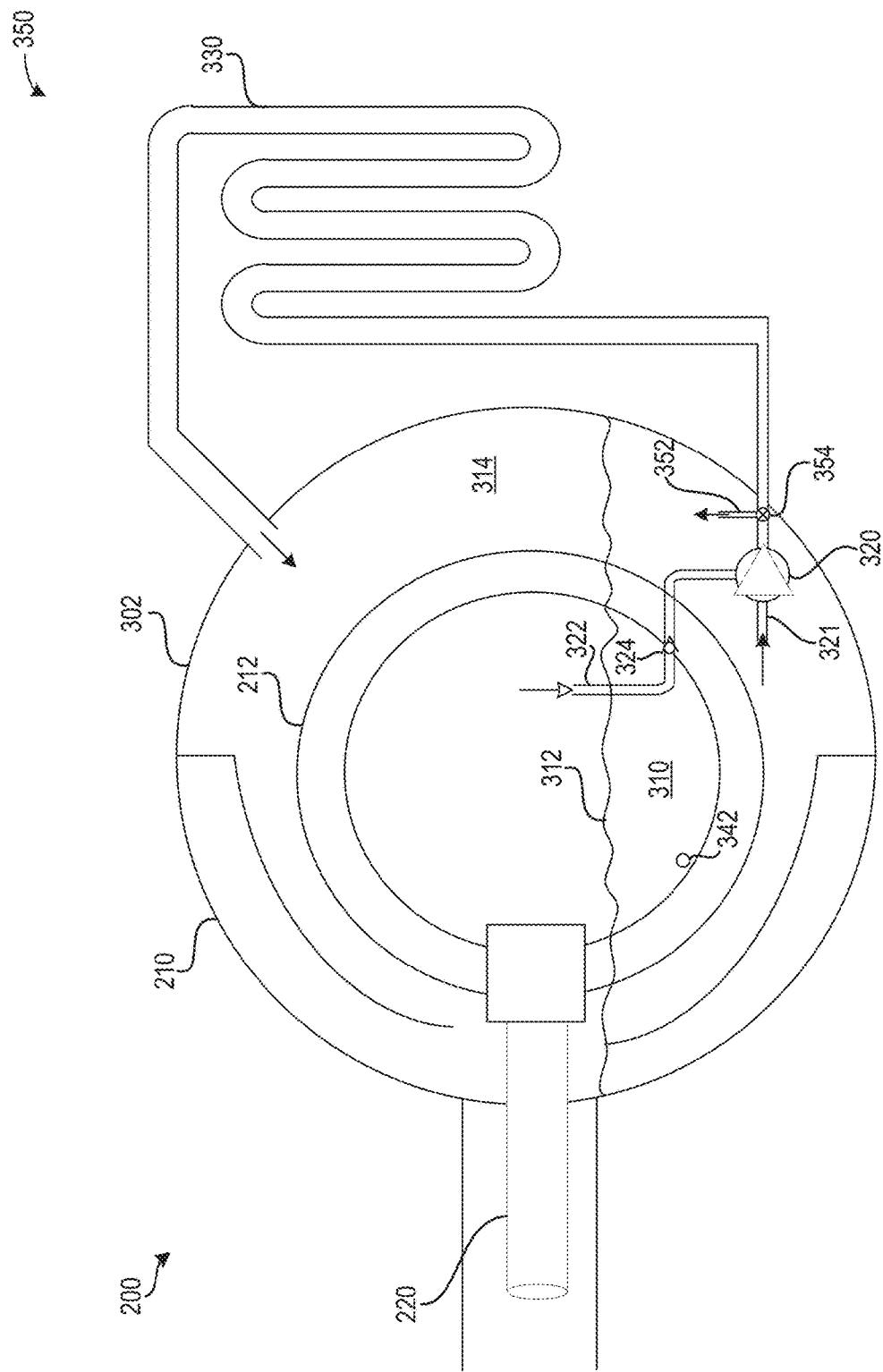
Figure 4A:
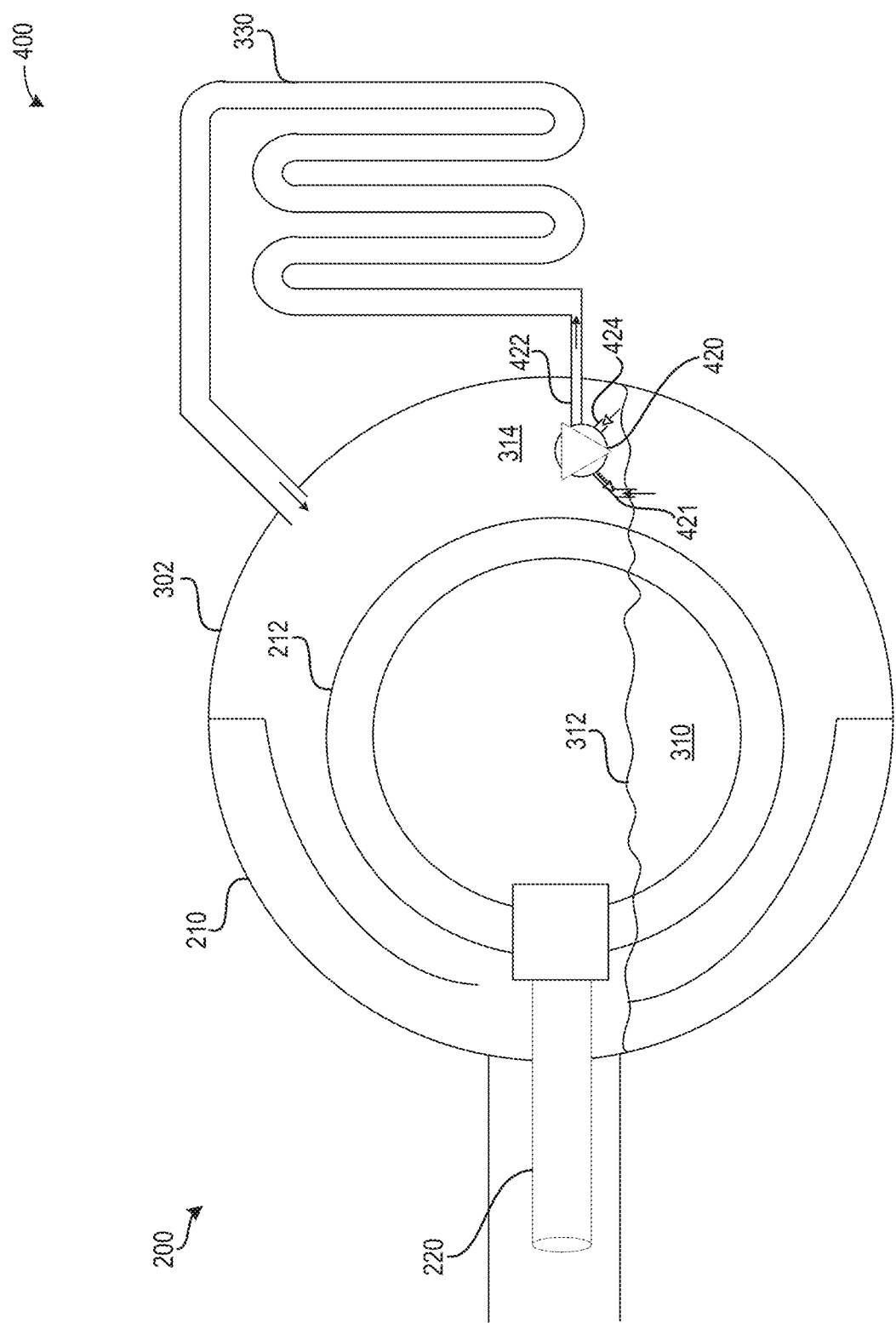
FIGS. 4A, 4B, and 4C illustrate second examples of the cross-section of the drive axle comprising a two-way pump.
Figure 4B:
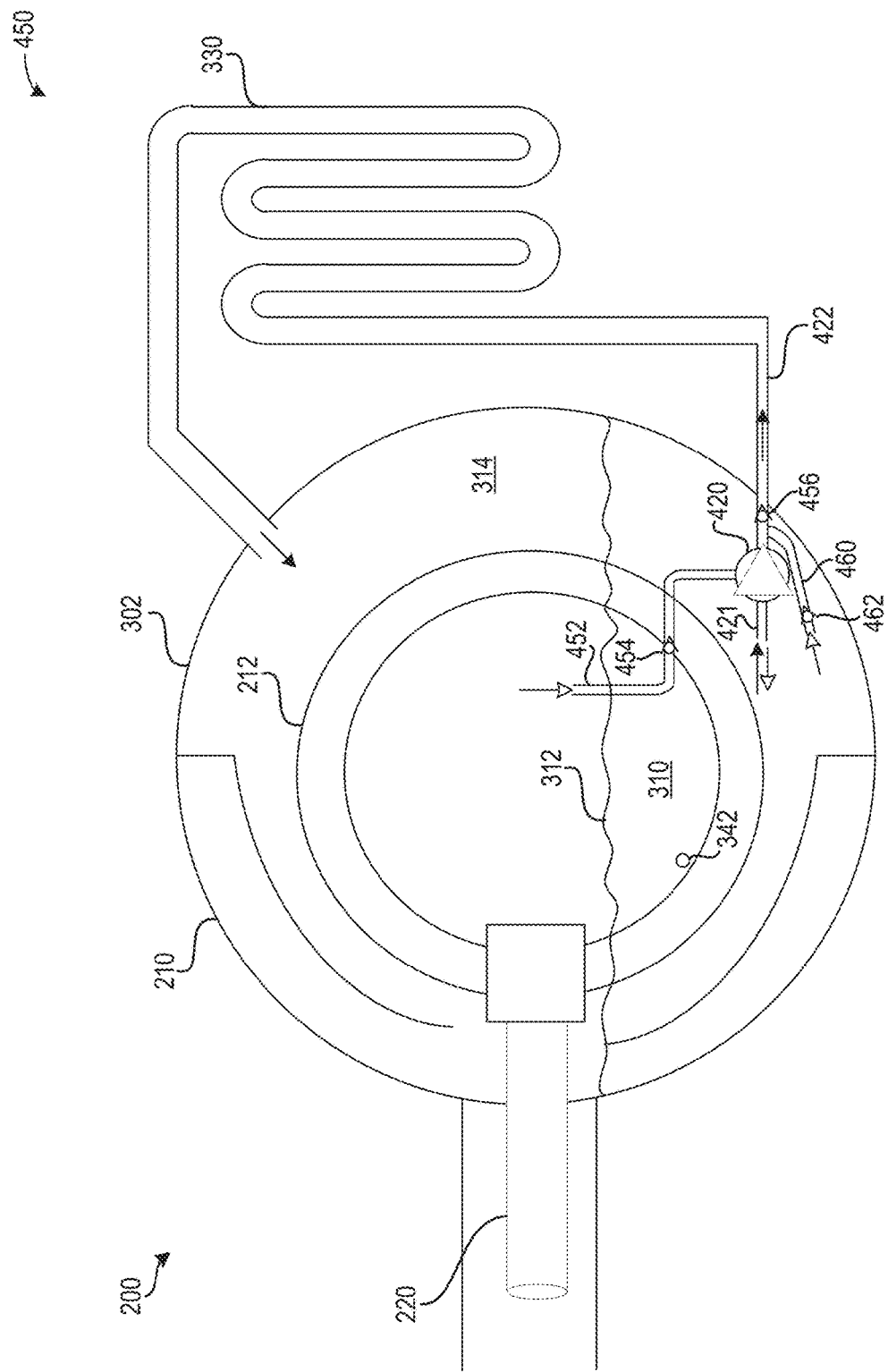
Figure 4C:
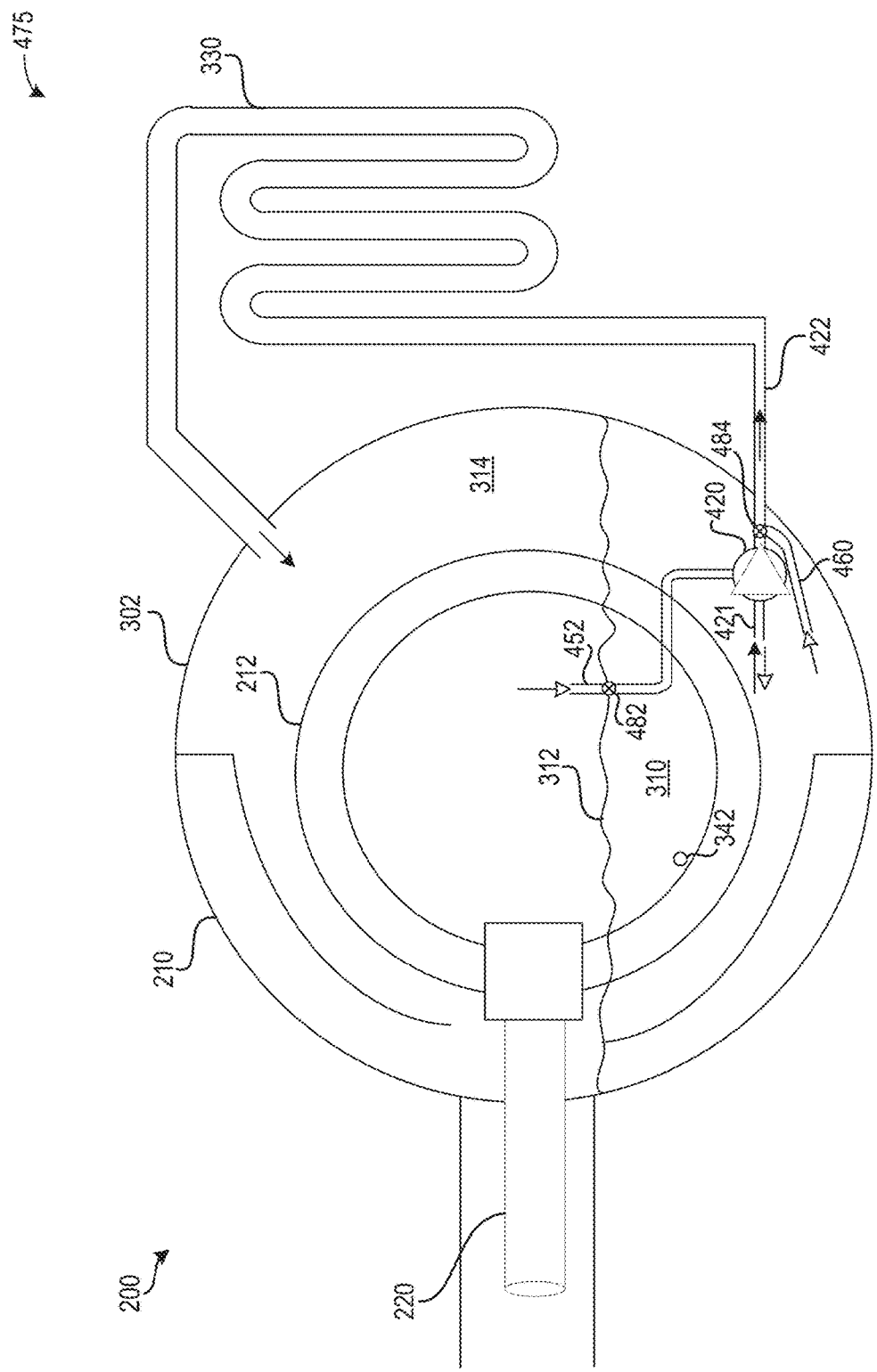
Figure 5:
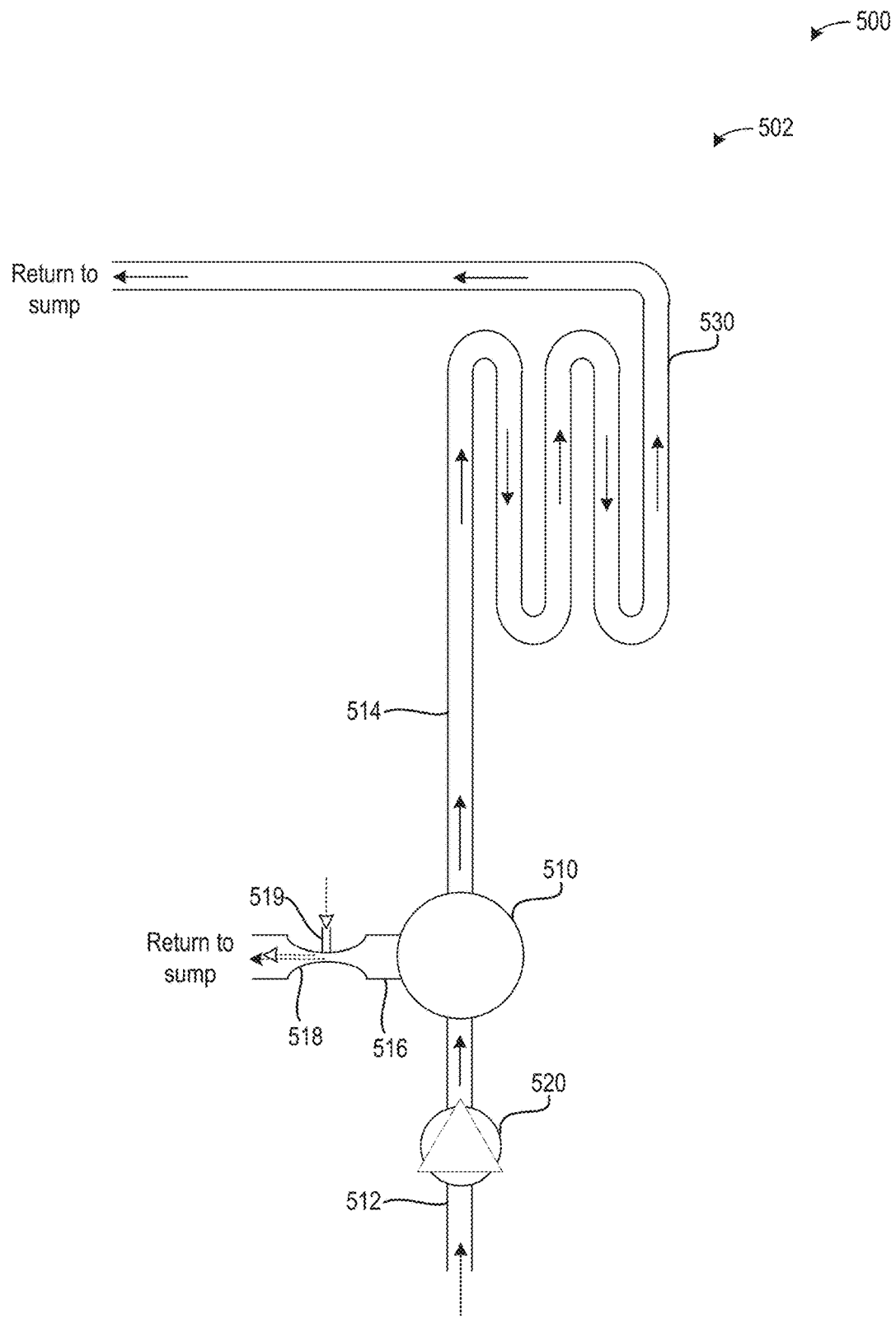
FIG. 5 illustrates an embodiment of a pump and a cooling arrangement of the drive axle.
Figure 6:
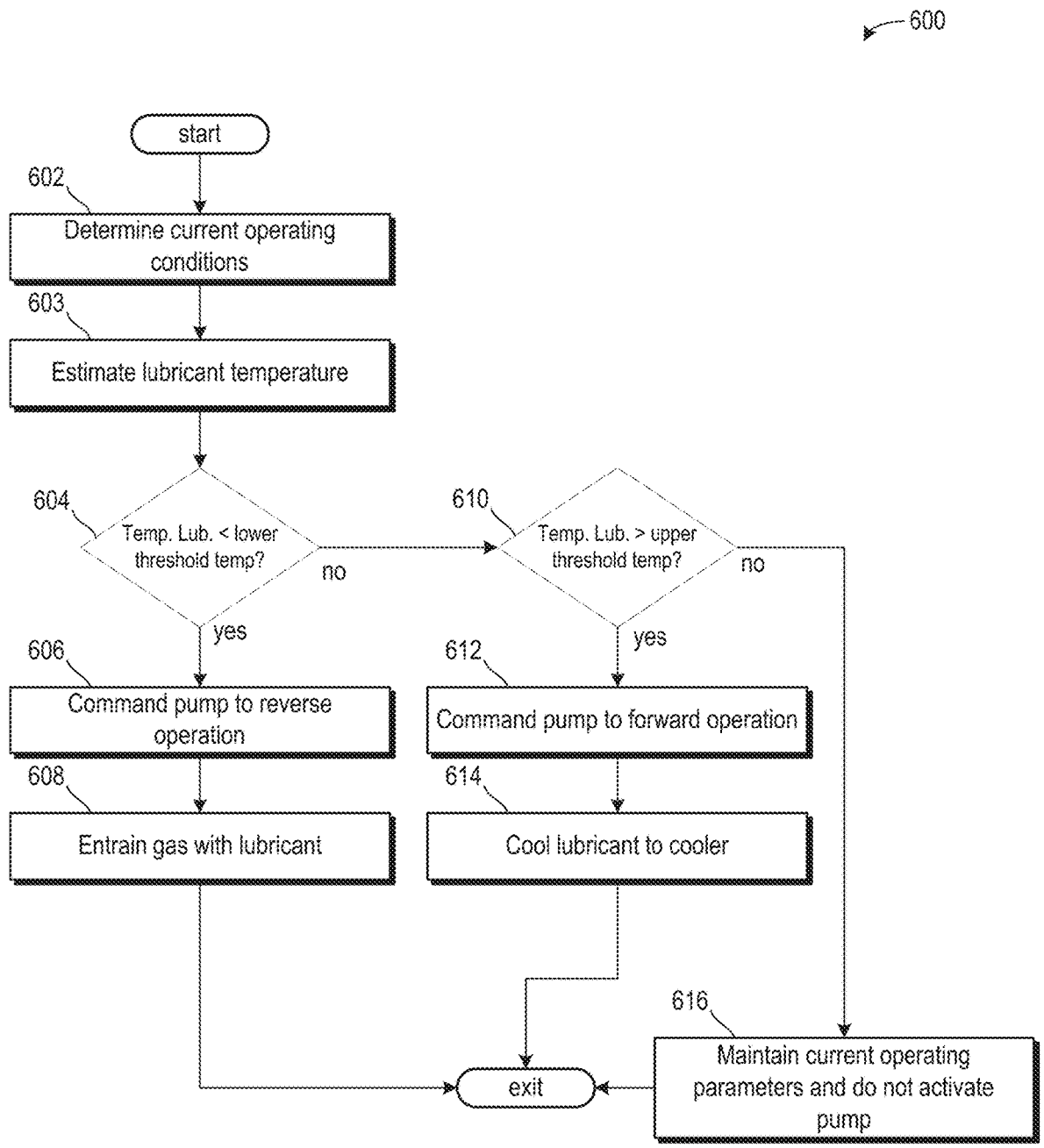
FIG. 6 illustrates a method for operating the pump.

The following description relates to systems and methods for a drive axle. In one example, the drive axle is a rear axle comprising a hypoid gear arrangement, wherein the hypoid gear arrangement is at least partially submerged in a wet bath comprising lubricant. In one example, the lubricant is oil. The drive axle may be used to transfer power from an engine of a vehicle to its wheels, as illustrated in FIG. 1. An example of the drive axle and the hypoid gear arrangement is illustrated in FIG. 2. A pump in conjunction with a cooling circuit for adjusting a temperature and/or density of lubricant in the drive axle is illustrated in FIGS. 3A and 3B as a one-way drug. FIGS. 4A, 4B, and 4C illustrate an example of the drive axle comprising a two-way pump which may operate in a first direction and a second direction opposite the first direction. An alternative embodiment of an arrangement for adjusting flow of lubricant within the drive axle is illustrated in FIG. 5. Therein, a valve is arranged downstream of the pump, wherein the valve may be temperature sensitive and configured to adjust flow of the lubricant to either a cooler or to a passage comprising a venturi for aerating the lubricant. A method for adjusting operation of the pump is illustrated in FIG. 6.

FIGS. 1-4C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. As shown, a drive axle 53 may be used to transfer power from the transmission 54 to the wheels 59, in one example. The drive axle 53 is a rear axle, in one example. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Turning now to FIG. 2, it shows a schematic example of a rear axle 200. In one example, the rear axle 200 may be a non-limiting example of the drive axle 53 of FIG. 1. Thus, it will be appreciated that the rear axle 200 may refer to other types and locations of drive axles. The rear axle 200 comprises an axle shaft 202. The axle shaft 202 may be a common shaft on which rear wheels of a vehicle are arranged. In one example, the axle shaft 202 may be fixed to the wheels and rotate with them. In another example, the axle shaft 202 may be fixed to the vehicle with the wheel rotating about the axle. In one example, additionally or alternatively, the axle shaft 202 may comprise two halves, a first half coupled to a first rear wheel and a second half coupled to a second rear wheel, wherein the first and second halves may independently rotate the first and second rear wheels.

A differential case 210 may comprise a differential drive gear 212 which may receive power from an engine (e.g., engine 140 of FIG. 1) via a pinion shaft 220 and a pinion gear 222. The pinion gear 222 and the differential drive gear 212 may be complementary to one another such that rotation of the pinion gear in a first direction may drive rotation of the differential drive gear 212 in a second direction, wherein the second direction rotates about a second axis perpendicular to a first axis about which the first direction rotates.

In one example, the pinion gear 222 and the differential drive gear 212 are in a hypoid gear arrangement. Therein, the pinion gear 222 may be offset from a center of the differential drive gear 222, along a large diameter shaft. Additionally, the gears may be beveled and spiraled, with a main variance such that mating gear axes do not intersect. Teeth on the gears may be helical and a pitch surface may be a hyperboloid. The hypoid gear of the present disclosure may comprise an arrangement known to those of ordinary skill in the art.

As the differential drive gear 212 rotates, it may rotate a pair of differential pinion gears 214 arranged on opposite sides of the differential drive gear. A first differential pinion gear of the pair of differential pinion gears may be configured to rotate a first differential side gear 216, which may result in motion (e.g., rotation) of a first half of the axle shaft 202. A second differential pinion gear of the pair of differential pinion gears may be configured to rotate a second differential side gear, which may result in rotation of a second half of the axle shaft 202. As described above, rotation of the axle shaft 202 may result in rotation of the rear wheels of the vehicle.

Turning now to FIG. 3A, it shows an embodiment 300 of a cross-section of the rear axle 200 of FIG. 2 taken along a direction parallel to the pinion shaft 220. As such, components previously introduced may be similarly numbered in this figure and in subsequent figures.

In the example of FIG. 3A, the embodiment 300 of the rear axle 200 comprises a pump 320 configured to direct lubricant 310 to a cooler 330. In the example of FIG. 3A, the pump 320 is a unidirectional pump configured to flow lubricant and/or air in one direction. The pump 320 is submerged within the lubricant 310. In one example, the pump 320 is completely submerged such that an entirety of the pump 320 is arranged below a top level 312 of the lubricant 310. The lubricant 310 and the pump 320 are arranged within the housing 210 and a cover 302 of the rear axle 200, wherein the housing 210 and the cover 302 comprise an interior space in which the pinion 220, the differential drive gear 212, and other portions of the rear axle 200 are arranged (e.g., pinion gears). A portion of the differential drive gear 212 may rotate through the lubricant 310, which may enhance performance of the differential drive gear 212.

However, as described above, during cold starts, a density of the lubricant may be relatively high compared to its density outside of cold starts where the lubricant is hotter. The increased lubricant density during the cold start may introduce a drag onto the differential ring gear 212, resulting in power losses and decreased fuel efficiency. As such, the pump 320 along with other components may be used to decrease the lubricant density during the cold-start.

For example, when a cold-start is occurring and a sensed and/or an estimated temperature of the lubricant 310 in the interior space (e.g., a sump) of the housing 210 and cover 302 is below a threshold temperature, then it may be determined that a density of the lubricant is relatively high. As such, the pump 320 may be activated and forcibly entrain gas 314 with the lubricant as the lubricant is pumped out of the sump, to the cooler 330, and back to the sump. In this way, the interior space may be filled with gears, lubricant, and the gas (e.g., helium). In one example, the gas 314 is helium. Additionally or alternatively, the gas 314 is air, a mixture of air and helium, or the like. Additionally or alternatively, the gas 314 may be a gas with a density lower than or equal to a density of air. In one example, the gas 314 may comprise methane (compressed natural gas) mixed with the air and/or helium. It will be appreciated that during the cold-start, the temperature of the lubricant 310 may be lower than a temperature of the cooler 330 such that cooling does not take place at the cooler 330 as the lubricant passes therethrough. Additionally or alternatively, the lubricant 310 may comprise emulsifier additive, such as a surfactant.

The pump 320 comprises a vent 322 with a valve 324. The vent 322 may extend from the pump 320 to a head space where the gas 314 is arranged. Said another way, the vent 322 extends above the top level 312 of the lubricant 310 such that the vent 322 may draw the gas 314. The valve 324 may open in response to the pump 320 being activated, in one example, wherein gas flows through the vent 322 and entrains with lubricant in the pump 320 before flowing to the cooler 330. As such, the valve 324 may be a check valve.

In one example, additionally or alternatively, the valve 324 may be a solenoid valve configured to actuate in response to a signal from a controller (e.g., controller 12 of FIG. 1). The solenoid valve may allow a cooling to occur without entraining air with the lubricant. When energized, the valve 324 may be opened and the lubricant may be entrained with gas and then flow through the cooler 330. While this may slow a warm-up of the lubricant, the emulsification may continue following deactivation of the pump 320, which may result in reduced emissions.

In one example, the pump 320 may comprise two settings, a first setting where lubricant is directed through the pump 320 via an inlet 321 and to the cooler 330 without entraining gas with the lubricant. As such, a rate of the pump (e.g., vacuum generated) may be insufficient to open the check valve 324, thereby blocking gas from entraining with the lubricant when the pump is activated to the first setting. The pump 320 may comprise a second setting, wherein lubricant is directed through the pump 320 and to the cooler 330 while further allowing gas to enter the pump 320 through the check valve 324 and vent 322. As such, a vacuum generated by the pump 320 may command the check valve 324 open during the second setting and allow gas 314 to enter the vent 322 and entrain with lubricant as the lubricant is directed to the cooler via the pump 320. The rate during the second setting may be sufficient to open the check valve 324 and allow gas to flow therethrough, wherein the gas is entrained with the lubricant and decreases its density, thereby decreasing a drag experienced by the differential drive gear 212. As illustrated, lubricant flow is illustrated via a black head arrow and gas flow is illustrated via a white head arrow. Thus, during both setting of the pump, lubricant is direct to the cooler, however, during the first setting, the pump does not entrain gas with the lubricant while gas is entrained with the lubricant during the second setting. It will be appreciated that during the second setting a temperature of the cooler may not be sufficient to cool the lubricant, which may be due to lubricant temperature being low. A lubricant temperature may be determined based on feedback from a temperature sensor 342. Feedback from the temperature sensor may adjust valve position and pump operation as will be described herein.

Turning to FIG. 3B, it shows an embodiment 350, which is substantially identical to the first embodiment 300, except that a release passage 352 and a three-way valve 354 are arranged in the first embodiment. In one example, the three-way valve 354 may be moved to a first position in response to the valve 324 being commanded to an open position. As such, when gas is mixed with the lubricant, the three-way valve 354 may be moved to the first position so that lubricant does not flow to the cooler 330. As such, the lubricant may be heated more rapidly during a cold-start in the embodiment 350 compared to the first embodiment 300.

When the valve 324 is closed and cooling is desired, the three-way valve 354 may be moved to a second position, thereby allowing lubricant to flow to the cooler 330. In one example, the three-way valve 354 may be a temperature controlled valve, such as a wax thermostatic valve. In one example, the valve is configured to move to the first position in response to a temperature being less than a lower temperature threshold and to the second position in response to the temperature being greater than an upper temperature threshold. The lower temperature threshold may be equal to 60° C. and the upper temperature threshold may be equal to 120° C. Operation of the valve may be in response to feedback from the temperature sensor 342. Additionally or alternatively, the valve 324 may be a wax thermostatic valve configured to open in response to a temperature falling below the lower temperature threshold while remaining closed in response to temperatures greater than or equal to the lower temperature. By utilizing wax thermostatic valves, the embodiments 300 and 350 may only include a single-direction electrical motor for the pump 320, thereby decreasing a cost and complexity of the rear axle 200.

Turning now to FIG. 4A, it shows a second embodiment 400 for a pump 420 configured to improve fuel economy at low temperatures of the rear axle 200 while being used in conjunction with a cooling circuit for a high temperature operation.

In the example of FIG. 4A, the pump 420 is arranged above the top level 312 of the lubricant 310 such that the pump 420 is exposed to the gas 314. The lubricant inlet 421 extends from the pump 420 and into a portion of the lubricant 310 below the top level 312. The pump 420 further comprises an outlet 422 for directing lubricant to the cooler 330 and back to the rear axle 200, as described above. The pump 420 additionally comprises a gas inlet 424 for entraining gas with lubricant based on an operation of the pump 420. The entraining may include an aeration of the lubricant or bubbling another gas (e.g., helium) into the lubricant such that the gas may dissolve in or be trapped in the lubricant.

Lubricant flow is illustrated via black head arrows and gas flow is illustrated via white head arrows. When the pump is commanded to operate in a first condition, lubricant is drawn through the lubricant inlet 421, through the outlet 422, to the cooler 330, and returned to the sump of the rear axle 200. The first condition may be selected in response to a temperature of the oil exceeding an upper temperature. In one example, the upper temperature may correspond to an upper threshold temperature of the lubricant where its density is too low to provide a desired amount of lubrication to the differential drive gear 212. Additionally or alternatively, the upper temperature may correspond to a boiling point of the lubricant, in one example. As such, the first condition may allow the lubricant to be cooled via the cooler 330 such that a desired temperature range of the lubricant is maintained without entraining gas (e.g., helium, air, carbon dioxide, etc.) into the lubricant.

When the pump is commanded to operate in a second condition, gas is drawn through the gas inlet 424, through the lubricant inlet 421, and mixed into the lubricant 310. The second condition may be selected in response to the temperature of the lubricant falling below a lower temperature. In one example, the lower temperature may correspond to a lower threshold temperature of the lubricant where its density is too high and provides a drag resistance to the differential drive gear 212. The lower temperature may occur during an engine cold-start, in one example. As such, during the second condition, only gas is drawn through the pump 420, and lubricant is not drawn through the pump 420 and delivered to the cooler 330. In this way, the gas is mixed into the lubricant 310 via reversing a flow of the pump 420 to direct gas from the head space of the rear axle 200 to the lubricant 310 in the sump.

Turning now to FIG. 4B, it shows an embodiment 450 of the rear axle 200 wherein the two-directional pump 420 is completely submerged in the lubricant 310. The pump 420 may operate in a first direction, where lubricant flows in a direction indicated by black head arrows. As such, lubricant flows through lubricant inlet 421, through the pump 420, and to the cooler 330. To reach the cooler 330, a cooler check valve 456 moves to an open position, wherein the cooler check valve 456 may be moved to an open position in response to a lubricant temperature exceeding the upper threshold temperature.

The pump 420 may operate in a second direction, opposite the first direction, in response to a lubricant temperature falling below the lower threshold temperature, which may be sensed by the temperature sensor 342. When the pump operates in the second direction, lubricant is drawn through an emulsification inlet 460 comprising a valve 462. The valve 462 may be commanded open in response to a suction from the pump 420 or in response to a temperature of the lubricant being less than the lower threshold temperature. Gas may enter the gas inlet 452 and flow through a valve 454, which may be opened in response to a low pressure generated by the pump 420. The lubricant and gas may mix at or adjacent to the pump 420 before exiting through the lubricant inlet 421 and mixing with lubricant in the sump.

Turning now to FIG. 4C, it shows an embodiment 475 of the rear axle comprising the bi-directional pump 420. The embodiment 475 is substantially identical to the embodiment 450, except that the embodiment 475 comprises electrically actuated valves, including a first valve 482 and a second valve 484. The first valve 482 may be a two-way valve arranged in the gas inlet 452 which is signaled to open in response to a sensed lubricant temperature being less than the lower threshold temperature, thereby indicating a density of the lubricant is relatively high and a cold-start is occurring. The second valve 484 may be an electronically controlled three-way valve arranged downstream of the pump 420 at an interface between the emulsification inlet 460 and the outlet 422. The second valve 484 may be moved to a first position when the pump operates in the first direction to allow lubricant to flow to the cooler 330. The second valve 484 may be moved to a second position when the pump 420 operates in the second direction, which allows lubricant to enter through the emulsification inlet 460, flow through the second valve 484 to the pump 420, and through the lubricant inlet 421 back to the sump. When lubricant enters the emulsification inlet 460, the first valve 482 is also commanded open so that gas may entrain with the lubricant before it returns to the sump.

In each of the examples shown in FIGS. 3A to 4C may comprise where the gas entrainment is arranged at a location where a suction of the pump is sufficient to draw gas through a gas inlet. As such, it may be desired to arrange the gas inlet as close as possible to the pump.

Turning now to FIG. 5, it shows an alternative embodiment 500 of an entraining/cooling arrangement 502, which comprises valve 510 for adjusting a lubricant flow through the entraining/cooling arrangement 502. Due to the inclusion of the valve 510, a complexity of the pump 520 may be reduced and a manufacturing cost may therefore also be reduced. Solid line arrows indicate a flow of lubricant when the valve 510 is in a first position and dashed line arrows indicate a flow of lubricant when the valve 510 is in a second position. Lubricant flow is illustrated via black head arrows and gas flow is illustrated via white head arrows.

The pump 520 may draw lubricant through a first passage 512, wherein lubricant flows through the first passage and to the valve 510. In one example, the valve 510 is temperature regulated, such that a position of the valve may switch in response to a sensed temperature of the lubricant. In one example, if the lubricant temperature is greater than or equal to a lower temperature, then the valve may be switched to a first position. In the first position, lubricant flows from the first passage to a second passage 514, wherein the second passage guides the lubricant to the cooler 530. Once the lubricant flows through the cooler 530, it is returned to a sump of a rear axle from where the lubricant was drawn.

If the lubricant temperature is less than the lower temperature, then the valve may be switched to a second position. In one example, the valve comprises a phase-changing material, such as wax, that is set to phase-change at the lower temperature. Thus, if the lubricant flowing through the valve 510 is less than the lower temperature, the wax may remain solid and the second position may be maintained. In the second position, the valve 510 may fluidly couple the first passage 512 to a third passage 516. A venturi 518 may be arranged within the third passage 516 with a vent 519 fluidly coupled to a venturi throat, wherein the venturi throat corresponds to a narrowest portion of the venturi 518. As lubricant flows through the venturi 518, a vacuum generated therein may pull gas through the vent 519. As such, gas may mix with the lubricant in the venturi 518 before exiting the third passage 516 and returning to the sump of the rear axle from which the lubricant was drawn.

In this way, the entraining/cooling arrangement 502 may be configured to either cool or entrain gas with the lubricant based on its temperature. In one example, the valve 510 of the entraining/cooling arrangement 502 may switch without electrical controls to direct the lubricant to be either cooled or aerated. Additionally or alternatively, the pump 520 may be integrally formed with the cover of the rear axle. Additionally or alternatively, the valve 510 may be electronically controlled, wherein the temperature of the lubricant may be sensed via a sensor or estimated via models based on data stored in a multi-input look-up table, wherein the inputs include vehicle speed, ambient temperature, and powertrain power (e.g., load). Positive displacement via the pump 520 may be powered via a gear or a vane. In one example, the pump 520 is solenoid activated.

Turning now to FIG. 6, it shows a method 600 for adjusting an operation of a pump arranged in a sump of a rear axle. Instructions for carrying out method 600 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 600 begins at 602, which includes determining current operating conditions. Current operating conditions may include determining, estimating, and/or measuring one or more of an engine temperature, engine speed, throttle position, vehicle speed, engine load, powertrain power, and air/fuel ratio. Additionally or alternatively, the current operating conditions may include determining an ambient temperature.

The method 600 proceeds to 603, which includes estimating a lubricant temperature. The lubricant temperature may be estimated based on an algorithm which factors a combination of the powertrain power, ambient temperature, and vehicle speed. In one embodiment, as the ambient temperature, the powertrain power, and/or vehicle speed increase, the lubricant temperature may also increase.

The method 600 proceeds to 604, which includes determining if the lubricant temperature is less than a lower threshold temperature. In one example, the lower threshold temperature may be based on a cold-start temperature of the vehicle. Additionally or alternatively, in one example, the lower threshold temperature is equal to a current ambient temperature. If the lubricant temperature is less than the lower threshold temperature, then the method 600 proceeds to 606, which includes commanding the pump to a reverse operation. In one example, the pump (e.g., pump 420 of FIG. 4) may be commanded to pull in a reverse direction, such that gas is drawn through a gas inlet. The method 600 proceeds to 608, which includes entraining gas with the lubricant. The gas drawn through the gas inlet may be mixed with lubricant in the sump of a rear axle, resulting in gas mixing with lubricant arranged in the sump. By doing this, a density of the lubricant is reduced while its temperature is below the lower threshold temperature. In one example, the pump does not draw lubricant and/or flow lubricant to the cooler.

If the lubricant temperature is not less than the lower threshold temperature, then the method 600 proceeds to 610, which includes determining if the lubricant temperature is greater than an upper threshold temperature. If the lubricant temperature is greater than the upper threshold temperature, then the method 600 proceeds to 612 to command the pump to a forward operation. The forward operation of the pump may result in lubricant flowing through a lubricant inlet, through the pump, and to a cooler. The method 600 proceeds to 614, which includes cooling lubricant in the cooler. Once the lubricant is cooled via the cooler, the lubricant is returned to the sump of the rear axle. As such, when the pump is run in the forward direction, the lubricant may not be entrained with gas.

If the lubricant temperature is not greater than the upper threshold temperature, then the lubricant temperature may be equal to or between the lower threshold temperature and the upper threshold temperature. As such, entraining gas with and cooling of the lubricant may not be desired. As such, the method 600 proceeds to 616, which includes maintaining current operating parameters and do not active the pump. As such, the lubricant may not be directed out of the sump and gas may not be directed to mix with the lubricant.

In this way, fuel economy may be enhanced via an arrangement configured to aerate or cool lubricant arranged in a sump of a rear axle. Aeration may occur in response to a lubricant temperature being less than a lower threshold and cooling may occur in response to the lubricant temperature being greater than an upper threshold. The technical effect of entraining the lubricant with gas is to decrease a friction in the rear drive axle at lower lubricant temperatures. By entraining the lubricant with gas during, for example, a cold-start, frictional drag experienced at the rear axle may be decreased, which may decrease emissions during the cold-start via the arrangement, which may have a low-cost of manufacture.

An embodiment of a system, comprises a pump arranged in a lubricant sump of a rear axle, wherein the lubricant pump is configured to drive in a first direction to direct oil to an oil cooler and a second direction to entrain gas with lubricant in the sump.

A first example of the system, further includes where the second direction is opposite the first direction, and wherein the second direction does not flow lubricant through the pump.

A second example of the system, optionally including the first example, further includes where the pump is arranged above a top level of lubricant in the sump, wherein the pump comprises a first passage at least partially submerged in the lubricant, a second passage fluidly coupling the pump to a cooler arranged outside of the rear axle, and a third passage fluidly coupled to a head space above the top level.

A third example of the system, optionally including one or more of the previous examples, further includes where lubricant flows through the first and second passages when the pump is operated in the first direction, wherein the lubricant flows to the cooler and is returned to the rear axle.

A fourth example of the system, optionally including one or more of the previous examples, further includes where gas flows through the third passage and the first passage when the pump is operated in the second direction, wherein gas flows into lubricant arranged in the sump, wherein the gas is helium.

A fifth example of the system, optionally including one or more of the previous examples, further includes where a controller with computer-readable instructions stored on non-transitory memory thereof that when executed enable the controller to operate the pump in the first direction in response to a lubricant temperature exceeding an upper threshold temperature.

A sixth example of the system, optionally including one or more of the previous examples, further includes where the instructions further enable the controller to operate the pump in the second direction in response to a lubricant temperature being less than a lower threshold temperature.

A seventh example of the system, optionally including one or more of the previous examples, further includes where the lower threshold temperature corresponds to a cold-start of an engine included in a vehicle in which the rear axle is arranged.

An eighth example of the system, optionally including one or more of the previous examples, further includes where the instructions further enable the controller to deactivate the pump in response to the lubricant temperature being between or equal to the lower and upper threshold temperatures.

An embodiment of a vehicle arrangement, comprises a rear axle configured to receive power from a powertrain including an engine, the rear axle comprising a hypoid gear arrangement arranged in a sump comprising a lubricant, a pump coupled to the rear axle, wherein the pump is configured to entrain gas with the lubricant by operating in a reverse direction, wherein the pump is configured to flow the lubricant to a cooler arranged outside of the rear axle by operating in a forward direction, and a controller with computer-readable instructions stored on non-transitory memory thereof that when executed enable the controller to operate the pump in the reverse direction when a lubricant temperature is less than a lower threshold temperature and operate the pump in the forward direction when the lubricant temperature is greater than an upper threshold temperature.

A first example of the vehicle arrangement further comprises where the lubricant temperature is based on one or more of an ambient temperature, a vehicle speed, and a powertrain power.

A second example of the vehicle arrangement, optionally including the first example, further includes where the pump is incorporated into a cover of the rear axle.

A third example of the vehicle arrangement, optionally including one or more of the previous examples, further includes where the pump comprises a first passage configured to admit lubricant through the pump in the forward direction or expel gas into the lubricant in the reverse direction, the pump further comprises a second passage configured only to flow lubricant to a cooler arranged outside of the rear axle, the cooler comprising a return passage configured to return lubricant to the sump, wherein the pump further comprises a third passage configured to only admit gas to the pump.

A fourth example of the vehicle arrangement, optionally including one or more of the previous examples, further includes where the first passage is at least partially submerged below a top level of the lubricant in the sump, and wherein the third passage is arranged completely above the top level of the lubricant in the sump.

A fifth example of the vehicle arrangement, optionally including one or more of the previous examples, further includes where the lubricant is oil, and wherein the gas comprises a density less than or equal to a density of air, and wherein the pump is a positive displacement pump.

An embodiment of a method, comprises activating a pump to operate in a first direction to flow lubricant through a first passage, to a second passage, and to a cooler in response to a lubricant temperature exceeding an upper threshold temperature, wherein the pump is arranged in a rear axle and the lubricant is arranged in a sump of the rear axle, activating the pump to operate in a second direction opposite the first direction to flow gas through a third passage, to the first passage, and into the sump to mix with lubricant in response to the lubricant temperature being less than a lower threshold temperature, and deactivating the pump in response to the lubricant temperature being between the upper threshold temperature and the lower threshold temperature.

A first example of the method further includes where the first passage is at least partially submerged in the lubricant arranged in the sump, and wherein the third passage is arranged above a top level of the lubricant arranged in the sump.

A second example of the method, optionally including the first example, further includes where flowing gas through the first passage includes flowing gas in a direction opposite a direction of lubricant flow through the first passage.

A third example of the method, optionally including the one or more of the previous examples, further includes where the lubricant leaving the cooler is returned to the sump.

A third example of the method, optionally including the one or more of the previous examples, further includes where the pump is inside a housing of the rear axle.

In another representation, the engine is an engine of a hybrid vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a pump arranged in a lubricant sump of a rear axle, wherein the lubricant pump is configured to drive in a first direction to direct oil to an oil cooler and a second direction to entrain gas with lubricant in the sump.

2. The system of claim 1, wherein the second direction is opposite the first direction, and wherein the second direction does not flow lubricant through the pump.

3. The system of claim 1, wherein the pump is at least partially submerged in the lubricant sump, wherein the pump comprises a first passage submerged below lubricant, a second passage fluidly coupling the pump to a cooler arranged outside of the rear axle, and a third passage fluidly coupled to a head space above a top level of the lubricant.

4. The system of claim 3, wherein lubricant flows through the first and second passages when the pump is operated in the first direction, wherein the lubricant flows to the cooler and is returned to the rear axle.

5. The system of claim 3, wherein gas flows through the third passage and the first passage when the pump is operated in the second direction, wherein gas flows into lubricant arranged in the sump, wherein the gas is helium.

6. The system of claim 1, further comprising a controller with computer-readable instructions stored on non-transitory memory thereof that when executed enable the controller to operate the pump in the first direction in response to a lubricant temperature exceeding an upper threshold temperature.

7. The system of claim 6, wherein the instructions further enable the controller to operate the pump in the second direction in response to a lubricant temperature being less than a lower threshold temperature.

8. The system of claim 7, wherein the lower threshold temperature corresponds to a cold-start of an engine included in a vehicle in which the rear axle is arranged, and wherein a temperature sensor is arranged in the lubricant sump.

9. The system of claim 7, wherein the instructions further enable the controller to deactivate the pump in response to the lubricant temperature being between or equal to the lower and upper threshold temperatures.

10. A vehicle arrangement, comprising:
a rear axle configured to receive power from a powertrain including an engine, the rear axle comprising a hypoid gear arrangement arranged in a sump comprising a lubricant;
a pump coupled to the rear axle, wherein the pump is configured to entrain gas with the lubricant by operating in a reverse direction, wherein the pump is configured to flow the lubricant to a cooler arranged outside of the rear axle by operating in a forward direction; and
a controller with computer-readable instructions stored on non-transitory memory thereof that when executed enable the controller to:

operate the pump in the reverse direction when a lubricant temperature is less than a lower threshold temperature; and
operate the pump in the forward direction when the lubricant temperature is greater than an upper threshold temperature.

11. The vehicle arrangement of claim 10, wherein the lubricant temperature is based on one or more of an ambient temperature, a vehicle speed, and a powertrain power.

12. The vehicle arrangement of claim 10, wherein the pump is incorporated into a cover of the rear axle and completely submerged in the lubricant.

13. The vehicle arrangement of claim 10, wherein the pump comprises a first passage configured to admit lubricant through the pump in the forward direction or expel gas into the lubricant in the reverse direction, the pump further comprises a second passage configured only to flow lubricant to a cooler arranged outside of the rear axle, the cooler comprising a return passage configured to return lubricant to the sump, wherein the pump further comprises a third passage configured to only admit gas to the pump.

14. The vehicle arrangement of claim 13, wherein the first passage is at least partially submerged below a top level of the lubricant in the sump, and wherein the third passage is arranged completely above the top level of the lubricant in the sump.

15. The vehicle arrangement of claim 10, wherein the lubricant is oil, and wherein the gas comprises a density less than or equal to a density of air, and wherein the pump is a positive displacement pump, and wherein the gas is methane.

16. A method, comprising:
activating a pump to operate in a first direction to flow lubricant through a first passage, to a second passage, and to a cooler in response to a lubricant temperature exceeding an upper threshold temperature, wherein the pump is arranged in a rear axle and the lubricant is arranged in a sump of the rear axle;
activating the pump to operate in a second direction opposite the first direction to flow gas through a third passage, to the first passage, and into the sump to mix with lubricant in response to the lubricant temperature being less than a lower threshold temperature; and
deactivating the pump in response to the lubricant temperature being between the upper threshold temperature and the lower threshold temperature.

17. The method of claim 16, wherein the first passage is at least partially submerged in the lubricant arranged in the sump, and wherein the third passage is arranged above a top level of the lubricant arranged in the sump.

18. The method of claim 16, wherein flowing gas through the first passage includes flowing gas in a direction opposite a direction of lubricant flow through the first passage.

19. The method of claim 16, wherein the lubricant leaving the cooler is returned to the sump.

20. The method of claim 16, wherein the pump is inside a housing of the rear axle.

* * * * *